United States Patent [19]

Kennedy et al.

[11] E Patent Number: Re. 32,675

[45] Reissued Date of Patent: May 24, 1988

[54] MINE STOPPING AND METHOD OF AND JACK FOR INSTALLING SAME

[76] Inventors: John M. Kennedy, 918 Mesa Verde Ct.; William R. Kennedy, P.O. Box 304, both of Taylorville, Ill. 62568

[21] Appl. No.: 923,819

[22] Filed: Oct. 27, 1986

Related U.S. Patent Documents

Reissue of:

[64] Patent No.: 4,483,642
Issued: Nov. 20, 1984
Appl. No.: 376,957
Filed: May 11, 1982

U.S. Applications:

[63] Continuation-in-part of Ser. No. 252,578, Apr. 9, 1981, abandoned.

[51] Int. Cl.[4] ..... E21F 1/14

[52] U.S. Cl. ..... 405/132; 52/489;573;712; 405/290

[58] Field of Search ..... 405/132, 282, 288, 290; 52/489, 573, 712, 764, 773

[56] References Cited

U.S. PATENT DOCUMENTS

| | | | |
|---|---|---|---|
| 587,274 | 7/1897 | Rue | 405/282 |
| 2,729,064 | 1/1956 | Kennedy et al. | 405/132 |
| 2,996,765 | 8/1961 | Nelsson | 52/489 X |
| 3,089,569 | 5/1963 | Shults | 52/489 |
| 3,164,230 | 1/1965 | Adams | 52/489 |
| 3,302,343 | 2/1967 | Bear | 405/132 X |
| 3,332,186 | 7/1967 | Cammaert | 52/573 X |
| 4,272,931 | 6/1981 | Brugman | 52/489 X |
| 4,332,512 | 6/1982 | Heintzmann | 405/290 |

*Primary Examiner*—David H. Corbin
*Attorney, Agent, or Firm*—Senniger, Powers, Leavitt and Roedel

[57] ABSTRACT

A mine stopping comprising a plurality of elongate panels adapted to extend vertically in side-by-side relation from the floor to the roof of a passageway in a mine. Each panel comprises a first elongate member constituting the lower member of the panel and second elongate member constituting the upper member of the panel, each member having a web and flanges at opposite sides of the web, one of the members having a telescoping sliding fit in the other. The upper member of each panel has a head at its upper end and a sealing member held in the head extending up out of the upper end of the upper member for engagement with the roof, the head being supported on the panel with the ends of the head spaced from the flanges of the upper member. The lower member of each panel has a foot at its lower end, the foot being secured to the lower panel member with the ends of the foot spaced from the side flanges thereof. The spacing of the ends of the head and ends of the foot from the side flanges of the panel members permits the side flanges to move toward one another to preserve the integrity of the stopping on relative lateral movement of the ribs toward one another. And a method of and jack for installing the mine stopping.

20 Claims, 3 Drawing Sheets

MINE STOPPING AND METHOD OF AND JACK FOR INSTALLING SAME

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of our copending application, Ser. No. 252,578, filed Apr. 9, 1981, now abandoned.

BACKGROUND OF THE INVENTION

This invention relates to a mine stopping, and more particularly to a mine stopping comprising a plurality of metal panels, and a method of and jack for installing same.

So-called mine "stoppings" are widely used in mines to stop off flow of air in passages in the mines, a stopping generally being installed at the entrance of a passage to block flow of air therethrough. This invention especially involves an improvement on the mine stopping of the type such as shown for example in U.S. Pat. No. 2,729,064 comprising a plurality of elongate extensible panels extending vertically in side-by-side relation from the floor to the roof of a passageway in a mine. Each panel has a head and a foot each comprising a metal plate secured to the upper and lower ends of the panel and means on each plate for sealing the stopping to the roof and floor of the passageway. A problem encountered with the prior mine stopping is the loss of the structural integrity of the stopping on relative lateral movement of the ribs toward one another which may occur when there is shifting and heaving of the mine in the vicinity of the passageway. The head and foot secured at the ends of each panel significantly limit the extent to which the panels can deform elastically under a compressive load with the result that undesireable permanent deformation and, perhaps, structural failure of one or more panels of the prior mine stopping may occur upon such lateral movement of the ribs.

SUMMARY OF THE INVENTION

Among the several objects of this invention may be noted the provision of an improved mine stopping of the above-described type which retains its structural integrity on relative lateral movement of the ribs of the mine toward one another; the provision of such a mine stopping which has panels which deform elastically upon being laterally compressed; the provision of such a mine stopping which has panels having an improved head and foot; the provision of such a mine stopping which can be installed in a passageway in a mine more quickly and with less labor than the prior mine stopping; the provision of such a mine stopping adapted to maintain a seal against the roof of the mine; the provision of such a mine stopping having improved resistance against yielding under air pressure resulting from ventilation of the mine and/or concussion from blasting in the mine; the provision of such a mine stopping having improved resistance to contraction of the extensible panels; the provision of such a mine stopping which is simpler and more economical than the prior mine stopping; and the provision of a method of and jack for installing such mine stoppings.

In general, the mine stopping of this invention comprises a plurality of elongate extensible panels adapted to extend vertically in side-by-side relation from the floor to the roof of a passageway in a mine. Each panel comprises a first elongate member constituting a lower member of the panel adapted for engagement of its lower end with the floor of the passageway, and a second elongate member constituting an upper member of the panel adapted for engagement of its upper end with the roof of the passageway. Each of the panel members is a sheet metal member of channel shape in cross section having a web and flanges at opposite sides of the web, each flange having an inturned portion at its outer edge extending generally parallel to the web and a lip at the inner edge of the inturned portion extending inwardly toward the web. One of the panel members has a telescoping sliding fit in the other with the webs of the members in engagement, the said one member constituting the inner member and the other constituting the outer member of the panel. A plurality of the panels are adapted to be installed in a passageway with the side flanges of the outer members of the panels generally in engagement. The lips of the upper member of each panel terminate short of the upper end of the upper member thereby providing a notch at the upper end of each lip, the upper member of each panel having a head at its upper end comprising a sheet metal member having a length less than the distance between the flanges of the upper member and greater than the distance between said lips. The head is generally of channel shape in transverse cross section and has a web of a width slightly less than the distance between the web of the upper panel member and the edges of the lips fitting between the web of the upper member and the edges of the lips, a first flange extending up from the edge of the web of the head at the inside face of the web of the upper panel member, a second flange extending up from the other edge of the web having a first portion extending up on the inside edges of the lips, a second portion extending out from the upper edge of the first portion over the upper edges of the lips, and a third portion extending up from the outer edge of the second portion on the inside of said inturned portions. The head is secured on the upper panel member at its upper end with the ends of the head spaced from the side flanges of the upper panel member. The lower member of each panel has a foot at its lower end comprising a sheet metal member having a length less than the distance between the flanges of the lower member and greater than the distance between said lips, the foot being secured on the lower panel member at its lower end with the ends of the foot spaced from the side flanges of the lower panel member. A sealing member is provided in the head and extends up out of the upper member for engagement with the roof of the passageway. The spacing of the ends of the head from the side flanges of the upper panel member and the spacing of the ends of the foot from the side flanges of the lower panel member permit the flanges to move toward one another with accompanying bowing of the webs of the panel members to preserve the integrity of the stopping on relative lateral movement of the ribs toward one another with resultant compression of the stopping from the sides thereof.

The method of installing the stopping comprises engaging the base of a jack with the foot of a lower panel member and the end of an extensible member of the jack with the head of the respective upper panel member, and extending the extensible member of the jack to force the lower panel member down and the upper panel member up for compressing the sealing member pocketed in the head against the roof of the passageway for sealing engagement of said sealing member with the roof.

The jack comprises a base adapted to fit between the flanges of a lower panel member and engage the respective foot and an extensible member having a head at its upper end adapted to fit between the flanges of an upper panel member and engage the head of the latter, the jack acting on extension of said extensible member to force the lower panel member down and the upper panel member up.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
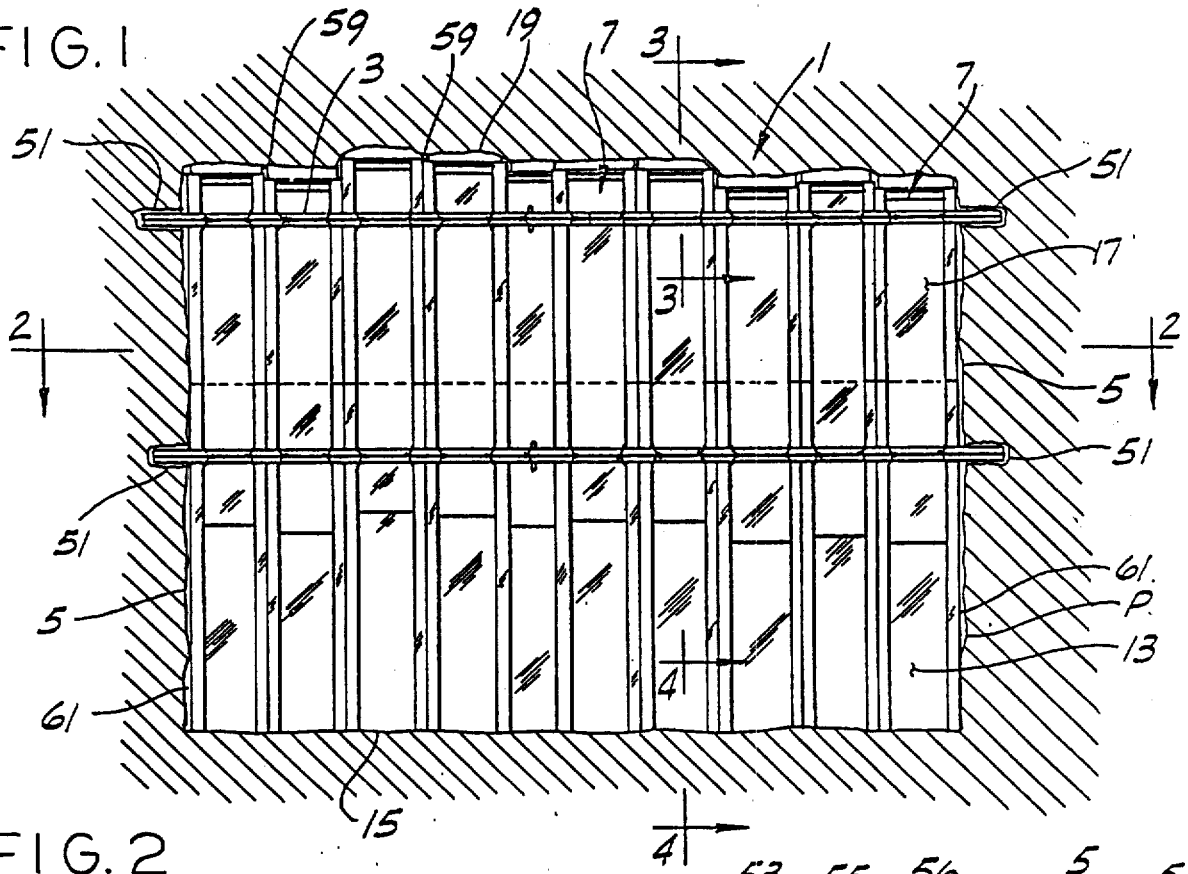
FIG. 1 is a rear elevation of a mine stopping installed in a passageway in a mine.

Referring to the drawings, there is generally indicated at 1 a mine stopping of this invention installed in passageway P in a mine comprising bars 3 adapted to extend substantially horizontally between ribs 5 at opposite sides of the passageway, and a plurality of elongate extensible panels 7 adapted to extend vertically in side-by-side relation from the floor to the roof of the passageway. A plurality of generally U-shaped wire ties 9 are provided to secure the panels 7 to the bars 3, each tie having a hook 11 at each end engageable with one of the panels and a central portion 12 adapted to be twisted so as to deform the tie around the bar to hold the respective panel in engagement with the bar. Preferably, each bar 3 comprises two or more steel angles, one angle overlapping another at their inner end margins, the angles being secured together by ties at said inner end margins thereof.

Figure 3:
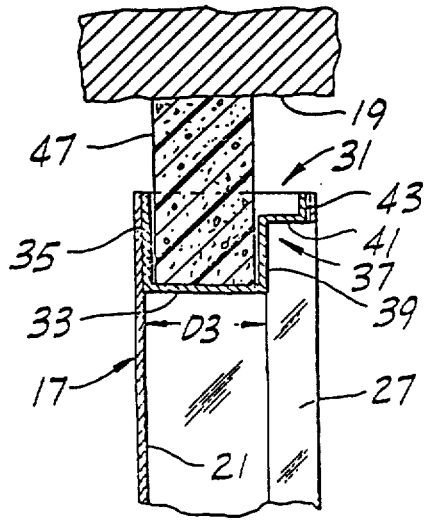
FIG. 3 is an enlarged vertical section on line 3—3 of FIG. 1 showing the head and sealing member at the upper end of one of the panels.
Figure 4:
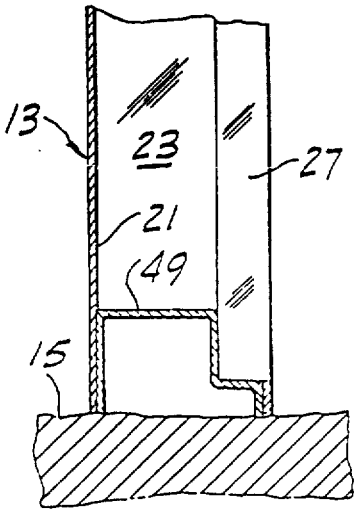
FIG. 4 is an enlarged vertical section on line 4—4 of FIG. 1 showing the lower end of the panel.
Figure 6:
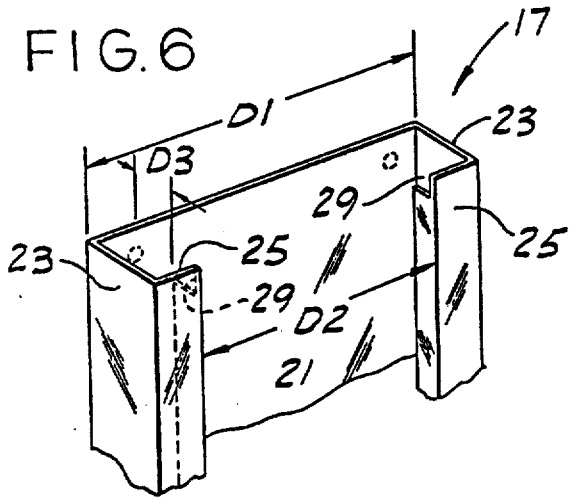
FIG. 6 is a perspective of the upper end of the panel.

Each of the panels 7 comprises a first elongate member 13 constituting a lower member of the panel adapted for engagement of its lower end with the floor 15 of the passageway, (as shown in FIG. 4) and a second elongate member 17 constituting an upper member of the panel adapted for engagement of its upper end with the roof 19 of the passageway (as shown in FIG. 3). Each panel member 13, 17 is a sheet metal member of channel shape in cross section having a web 21 and flanges both designated 23 at opposite sides of the web (see FIG. 6). Each flange has an inturned portion 25 at its outer edge extending generally parallel to the web and a lip 27 at the inner edge of the inturned portion extending toward the web. The upper panel member 17 is shown as having a telescoping fit in the respective lower panel member 13, the webs 21 of the members being in sliding engagement. (This could be reversed—the lower panel member may have a telescoping sliding fit in the upper panel member.) The lips 27 of each upper panel member 17 terminate short of the upper end of the upper member thereby providing a notch 29 at the upper end of each lip of the upper panel member. Similarly, the lips of each lower panel member 13 terminate short of the lower end of the lower member thereby providing a notch at the lower end of each lip of the lower panel member.

Figure 5:
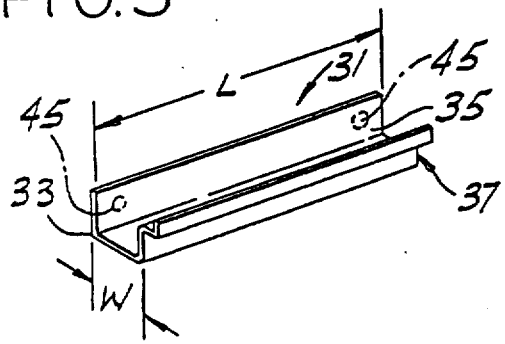
FIG. 5 is a perspective of the head.

The upper member of each panel has a head 31 at its upper end comprising a sheet metal member having a length L less than the distance D1 between the flanges 23 of the upper member and greater than the distance D2 between the lips 27 of the upper panel member. The head is generally of channel shape in transverse cross section having a web 33 of a width W slightly less than the distance D3 between the web of the upper panel member and the edges of the lips and fits between the web 21 of the upper panel member and the edges of the lips 27. The head 31 further has a first flange 35 extending up from the edge of the web of the head at the inside face of the web 21 of the upper panel member, a second flange 37 extending up from the other edge of the web having a first portion 39 extending up on the inside edges of the lips, a second portion 41 extending out from the upper edge of the first portion over the upper edges of the lips, and a third portion 43 extending up from the outer edge of the second portion on the inside of the inturned portions 25 of the flanges 23 (see FIGS. 3 and 5). The head 31 is secured to the upper panel member 17 at its upper end with the ends of the head spaced from the side flanges 23 of the upper panel member by suitably attaching the first flange 35 of the head to the web 21 of the upper panel member at the upper corners of the first flange 35, the areas of attachment being generally designated 45.

As illustrated, a sealing member 47 is pocketed in each head 31 and extends up out of the upper end of said upper member for engagement with the roof 19 of the passageway. The sealing member comprises a block of self-extinguishing expanded polystyrene (other suitable material may be used) which readily conforms to the contour of the roof of the passageway to form a seal at the top of the panel when pressed into engagement with the roof. The sealing member is preferably resilient so that, when compressed against the roof, it not only conforms to the roof contour but also has a spring-back or expansion effect to maintain the stopping seal, despite occurrences such as concussion effects from blasting in the mine that might otherwise tend to break the seal. Resilient materials other than polystyrene may be used. It is also contemplated that a sealing member backed by springs may be used and it is intended that "resilient sealing member" cover this.

The lower member 17 of each panel has a foot 49 at its lower end having a configuration similar to that of the head, a length less than the distance between the flanges 23 of the lower panel member and greater than the distance between the lips 27 of the lower panel member, and a width slightly less than the distance between the web 21 of the lower panel member and the edges of the lips 27 (see FIG. 4). The foot is secured in the lower panel member at its lower end with the ends of the foot spaced from the side flanges of the lower panel member by attaching the first flange of the foot to the web 21 of the lower panel member at the lower corners of the first flange of the foot. Because the floor 15 of the passageway is relatively flat as compared to the roof 19 of the passageway and usually covered with a thick layer of dust, a sealing member such as sealing member 47 need not be provided in the foot 49 to effect an adequate seal between the lower panel member 13 and the floor.

Figure 7:
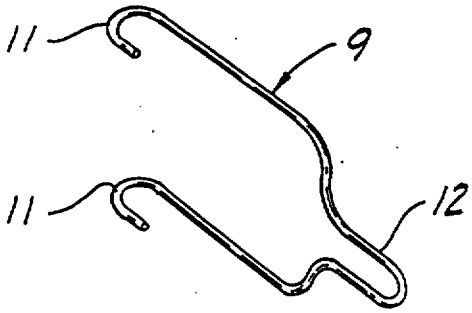
FIG. 7 is an enlarged perspective of a wire tie as supplied for securing the panels to a support bar.

The spacing of the ends of the head 31 from the side flanges 23 of the respective upper panel member, the spacing of the ends of the foot 49 from the side flanges 23 of the respective lower panel member, and the location of the attachments 45 securing the head and foot to the respective panel member enable the flanges to move toward one another with accompanying bowing of the web 21 of each panel member, as shown in FIG. 7, to preserve the integrity of the stopping 1 on relative lateral movement of the ribs 5 toward one another with resultant compression of the stopping from the sides thereof.

Figure 2:
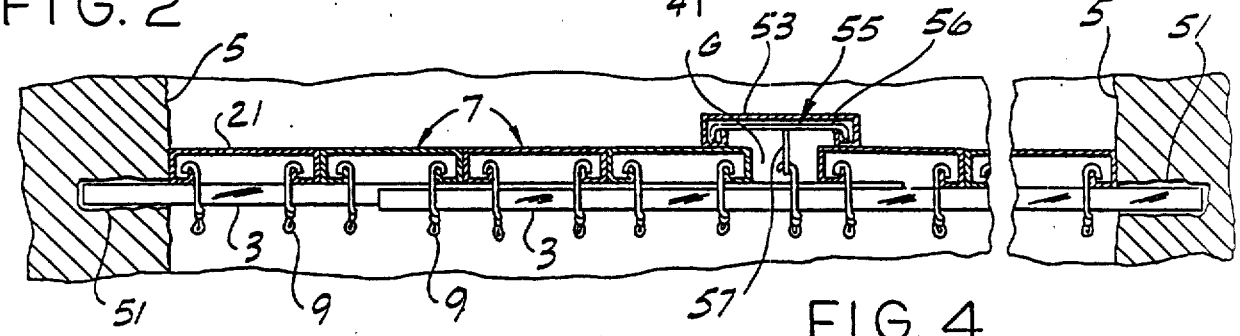
FIG. 2 is an enlarged horizontal section on line 2—2 of FIG. 1.

To install the mine stopping 1 of this invention in the passageway P, holes 51 are established in the ribs 5 and the ends of the bars 3 are inserted therein. One of the panels 7 is positioned with its inturned portions 25 in engagement with the bars and with one of its side flanges 23 in engagement with a rib 5. Wire ties 9 are placed over the bars with hooks 11 extending over the edges of the lips 27 of the panel to hold the panel in place against the support bars. The panel is extended to move the foot 49 of the lower panel member down into sealing engagement with the floor 15 of the passageway, and to move the upper panel member up into sealing engagement with the roof 19, the upper surface of the sealing member conforming to the contour of the roof upon being pressed against the roof. The central portions 12 of the wire ties 9 are then twisted to secure the panel to the support bars. A second panel 7 is installed at the other rib 5 of the passageway in a manner similar to that just described. Additional panels 7 are similarly installed in side-by-side relation between the first and second panels to form an array of panels across the entrance to the passageway P. A gap G is often present in the array, and a lap pan 53 similar in construction to the panels 9 may be utilized for covering such a gap (see FIG. 2). The lap pan 53 is secured to the bars 3 by a pair of clamps 55 each comprising a crossbar 56 having flanges at its ends engageable with the inner faces of the inturned portions 25 of the lap pan, a central lug 57 extending toward the respective support rod having holes therein adapted to receive the hooks 11 of a wire tie 9. With lap pan 53 secured over the gap G, the spaces generally indicated at 59 in FIG. 1 between the ends of adjacent sealing members 47, and the spaces generally indicated at 61 between the ribs 5 and the panels 7 in engagement therewith are filled with a suitable material such as a fiber plaster provide a substantially air-tight seal at the stopping.

Upon relative lateral movement of the ribs 5 toward one another, the width of the gap G narrows as the panels at one side of the gap move laterally toward the panels at the other side of the gap. When the panels formerly spaced apart at the gap move into engagement, continued relative lateral movement of the panels results in compression of the panels. The spacing of the ends of the heads 31 from the side flanges 23 of the upper panel members 17 and the spacing of the ends of the feet 49 from the side flanges 23 of the lower panel members 13 permit the side flanges to move toward one another with accompanying bowing of the webs 21 of the panel members to prevent permanent deformation of the panels thereby preserving the integrity of the stopping.

Figure 9:
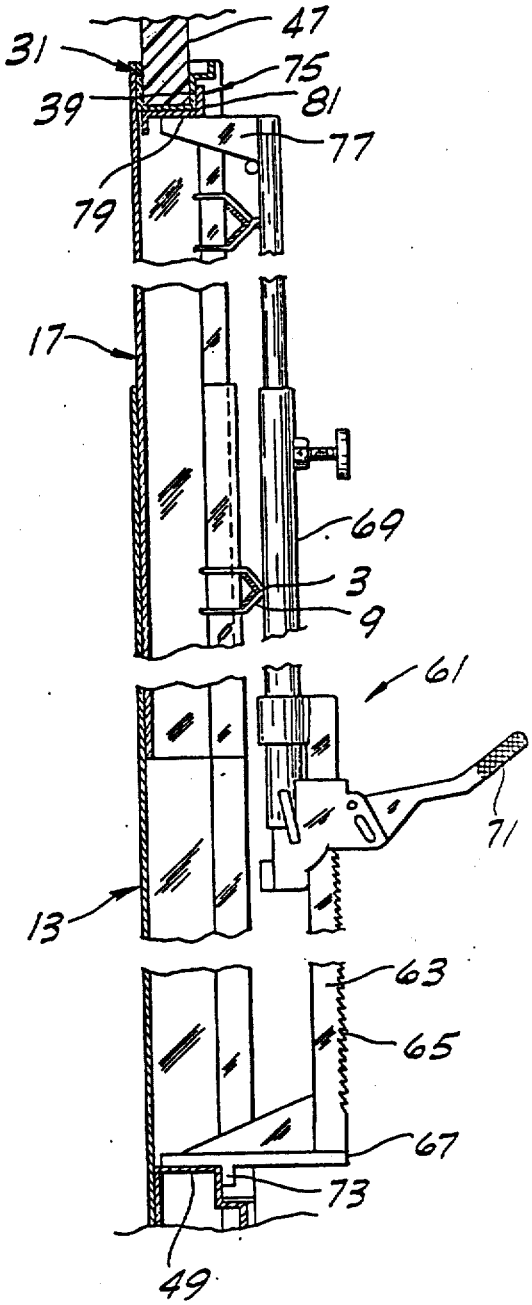
FIG. 9 is a vertical section showing the installation of a panel and a jack used in the installation.
Figure 8:
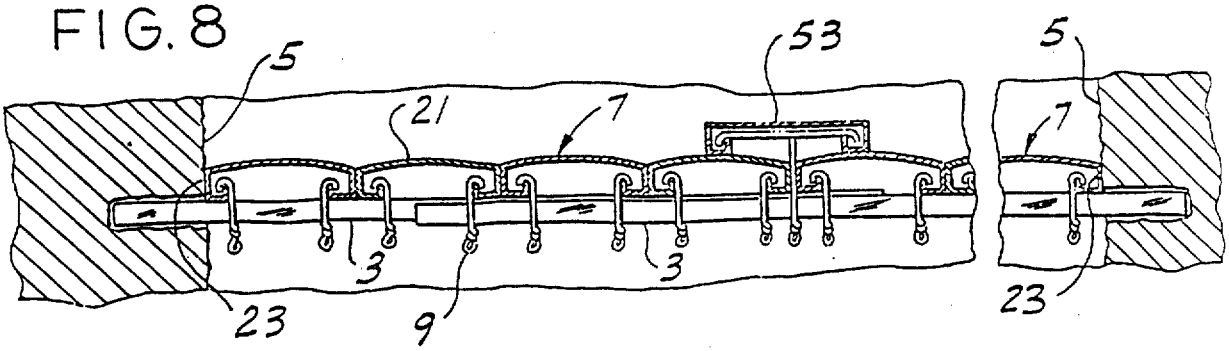
FIG. 8 is a horizontal section similar to FIG. 2 showing the panels of the mine stopping deformed on relative lateral movement of the ribs toward one another.

FIG. 9 illustrates a method of this invention of installing the stopping utilizing a jack 61 modified in accordance with this invention for the purpose. The jack, as illustrated, is a ratchet jack comprising a vertical post 63 formed with ratchet teeth 65, the post extending up from a base 67, and an extensible member 69 movable up and down on the post by means of a lever 71. The post extends up from the base adjacent one end of the base, which is narrow enough to fit between the lips 27 of the lower panel member 13, and which has a transverse lug 73 on its bottom. That part of the base extending beyond the lug is engageable with the top of the foot 49 of a lower panel member 13 and the lug 73 is engageable with the outside of the foot. The extensible member, which is offset from the post in the direction toward the distal end of the base, has a stepped head 75 at its upper end, this head being mounted on an arm 77 extending laterally outwardly from the extensible member directly above the base and having a horizontal leg 79 engageable with the bottom (web 33) of the head 31 at the upper end of the upper panel member 17 and an upwardly extending vertical leg 81 engageable with the outside of the head 31 at 39.

In installing a stopping, the base 67 of the jack is engaged as shown in FIG. 9 with the foot 49 of a lower panel member 13 and the head 75 of the extensible member 69 of the jack is engaged as shown in FIG. 9 with the head 31 at the upper end of the respective upper panel member 17. Then the extensible member 69 is extended to force the lower panel member down and the upper panel member up for compressing the sealing member 47 pocketed in the head 31 against the roof 19 of the passageway P for sealing engagement of sealing member 47 with the roof. Engagement of the lug 73 with the outside of foot 49 and of the leg 81 of head 75 of the jack with head 31 aids in preventing the jack from bowing and popping out. Following the extension of the upper and lower panels 13 and 17 of a panel 7, the jack is removed and used on the next panel 7.

Figure 10:
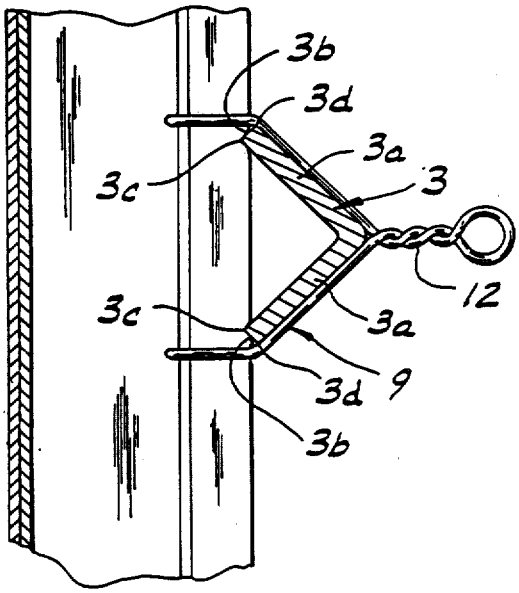
FIG. 10 is an enlarged fragment of FIG. 9 showing a modification of an angle bar used in the stopping.

The bars 3 may be rolled steel angles, but it is preferred that each of these bars comprises an angle bent from sheet steel (relatively thick sheet steel, e.g. 0.108 inch thick) with the legs 3a of the angle having generally flat outer edges 3b and thereby having relatively sharp inner and outer corners 3c and 3d along said outer edges, as shown in FIG. 10. The angle extends along the panels 7 with the said sharp inner corners 3c of the legs of the angle biting into the panels (i.e. into the inturned portions 25 of the panel members) under the tension of the wire tie members 9 which comes into play when the ties are twisted at 12. This bite between the angles and the panel members makes the stopping stronger and more resistant to yielding under air pressure resulting from ventilation of the mine and/or concussion from blasting in the mine. It is to be noted that the legs of rolled steel angles have rounded edges instead of sharp-cornered edges, and do not provide the bite such as attained by the angles bent from sheet steel stock.

Figure 11:
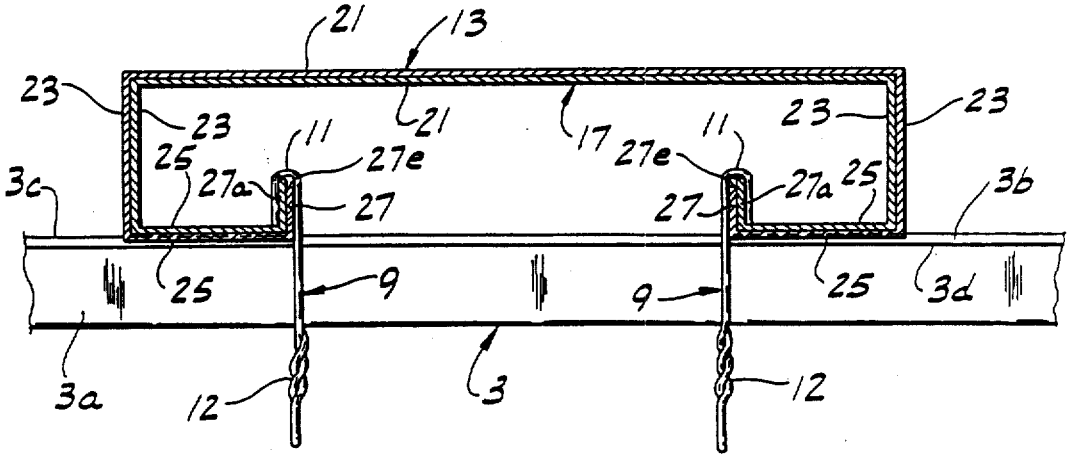
FIG. 11 is a section showing a modification of a panel member of the stopping.

Referring to FIG. 11, a modification of the panels 7 is illustrated, involving forming the lips of the inner members 17 of the panels to extend inwardly toward the webs of the said inner members beyond the lips of the outer members 13 of the panels. In FIG. 11, the lips of the inner members 17 are specially designated 27a to distinguish them from lips 27 of the outer members 13 and it will be observed that the lips 27a are made of such width relative to lips 27 as to effect the desired extension of lips 27a beyond the edges of lips 27. The hooks 11 of ties 9 engage the inner edges of lips 27a of inner members 17 where they fit in outer members 13, and draw the inturned portions 25 of inner members 17 against the inturned portions 25 of outer members 13 for improved resistance to contraction of the extensible panels.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A mine stopping comprising:

a plurality of elongate extensible panels adapted to extend vertically in side-by-side relation from the floor to the roof of a passageway in a mine, each panel comprising a first elongate member constituting a lower member of the panel adapted for engagement of its lower end with the floor of the passageway, and a second elongate member constituting an upper member of the panel adapted for engagement of its upper end with the roof of the passageway, each of said panel members being a sheet metal member of channel shape in cross section having a web and flanges at opposite sides of the web, each flange having an inturned portion at its outer edge extending generally parallel to the web and a lip at the inner edge of the inturned portion extending inwardly toward the web, one of said members having a telescoping sliding fit in the other with the webs of the members in engagement, the one member constituting the inner member and the other constituting the outer member of the panel, a plurality of the panels being adapted to be installed in a passageway with the side flanges of the outer members generally in engagement, the lips of the upper member of each panel terminating short of the upper end of the upper member and thereby providing a notch at the upper end of each lip, the upper member of each panel having a head at its upper end comprising a sheet metal member having a length less than the distance between the flanges of the upper member and greater than the distance between said lips, the head being generally of channel shape in transverse cross section having a web of a width slightly less than the distance between the web of the upper panel member and the edges of the lips fitting between the web of the upper member and the edges of the lips, a first flange extending up from the edge of the web of the head at the inside face of the web of the upper panel member, a second flange extending up from the other edge of the web having a first portion extending up on the inside edges of the lips, a second portion extending out from the upper edge of the first portion over the upper edges of the lips, and a third portion extending up from the outer edge of the second portion on the inside of said inturned portions, the head being secured in the upper panel member at its upper end with the ends of the head spaced from the side flanges of the upper panel member, the lower member of each panel having a foot at its lower end comprising a sheet metal member having a length less than the distance between the flanges of the lower member and greater than the distance between said lips, the foot being secured in the lower panel member at its lower end with the ends of the foot spaced from the side flanges of the lower panel member and a sealing member pocketed in said head and extending up out of the upper end of said upper member for engagement with said roof, the spacing of the ends of the head from the side flanges of the upper panel member and the spacing of the ends of the foot from the side flanges of the lower panel member permitting the flanges to move toward one another with accompanying bowing of the webs of the panel members to preserve the integrity of the stopping on relative lateral movement of the ribs of the passageway toward one another with resultant compression of the stopping from the sides thereof.

2. A mine stopping as set forth in claim 1 wherein the sealing member comprises a block of expanded polystyrene or the like.

3. A mine stopping as set forth in claim 1 further comprising at least one bar adapted to extend substantially horizontally between ribs at opposite sides of the passageway in the mine, a plurality of generally U-shaped wire ties for securing the panels to the bar, each tie having a hook at each end adapted to extend over the edge of the lip of one of said panels, and a central portion adapted to be twisted so as to deform the tie around the bar to hold the respective panel in engagement with the bar.

4. A mine stopping as set forth in claim 1 wherein each head is secured to the web of the respective upper panel member.

5. A mine stopping as set forth in claim 4 wherein said first flange of each head is secured to the web of the respective upper panel member at the upper corners of the first flange.

6. A mine stopping as set forth in claim 3 wherein the lips of the lower member of each panel terminate short of the lower end of the lower member and thereby provide a notch at the lower end of each lip.

7. A mine stopping as set forth in claim 6 wherein each foot is generally of channel shape in transverse cross section having a web of a width slightly less than the distance between the web of the lower panel member and the edges of the lips fitting between the web of the lower member and the edges of the lips, a first flange extending down from the edge of the web of the foot at the inside face of the web of the lower panel member, a second flange extending down from the other edge of the web having a first portion extending down on the inside edges of the lips, a second portion extending out from the lower edge of the first portion over the lower edges of the lips, and third portion extending down from the outer edge of the second portion on the inside of said inturned portions, the foot being secured in the lower panel member at its lower end with the ends of the foot spaced from the side flanges of the lower panel member, each foot has a length less than the distance between the flanges of the respective lower panel member and greater than the distance between the lips and a width slightly less than the distance between the web of the respective lower panel member and the edges of the lips.

8. A mine stopping as set forth in claim 7 wherein each foot is secured in the respective lower panel member at its lower end with the ends of the foot spaced from the side flanges of the lower panel member.

9. A mine stopping as set forth in claim 8 wherein the first flange of the foot is secured to the web of the respective lower panel member at the lower corners of the first flange.

10. A mine stopping as set forth in claim 1 having a resilient sealing member pocketed in the head.

11. A mine stopping as set forth in claim 10 wherein the resilient sealing member comprises a block of polystyrene.

12. A mine stopping as set forth in claim 3 wherein said bar comprises an angle bent from sheet steel, the legs of the angle having generally flat outer edges and thereby having relatively sharp inner and outer corners along said outer edges, said angle extending along the panels with the said sharp inner corners of the legs of the angle biting into the panels under tension of the wire ties.

13. A mine stopping as set forth in claim 3 wherein the lips of the inner members of the panels extend inwardly toward the webs of said inner members beyond the lips of the outer members of the panels, and the hooks of the ties engage the inner edges of the lips of the inner members and draw the inturned portions of the inner members against the inturned portions of the outer members.

14. The method of installing a mine stopping comprising a plurality of elongate extensible panels adapted to extend vertically in side-by-side relation from the floor to the roof of a passageway in a mine, each panel comprising a first elongate member constituting a lower member of the panel adapted for engagement of its lower end with the floor of the passageway, and a second elongate member constituting an upper member of the panel adapted for engagement of its upper end with the roof of the passageway, each of said panel members being a sheet metal member of channel shape in cross section having a web and flanges at opposite sides of the web, each flange having an inturned portion at its outer edge extending generally parallel to the web and a lip at the inner edge of the inturned portion extending inwardly toward the web, one of said members having a telescoping sliding fit in the other with the webs of the members in engagement, the one member constituting the inner member and the other constituting the outer member of the panel, a plurality of the panels being adapted to be installed in a passageway with the side flanges of the outer members generally in engagement, the lips of the upper member of each panel terminating short of the upper end of the upper member and thereby providing a notch at the upper end of each lip, the upper member of each panel having a head at its upper end comprising a sheet metal member having a length less than the distance between the flanges of the upper member and greater than the distance between said lips, the head being generally of channel shape in transverse cross section having a web of a width slightly less than the distance between the web of the upper panel member and the edges of the lips fitting between the web of the upper member and the edges of the lips, a first flange extending up from the edge of the web of the head at the inside face of the web of the upper panel member, a second flange extending up from the other edge of the web having a first portion extending up on the inside edges of the lips, a second portion extending out from the upper edge of the first portion over the upper edges of the lips, and a third portion extending up from the outer edge of the second portion on the inside of said inturned portions, the head being secured in the upper panel member at its upper end with the ends of the head spaced from the side flanges of the upper panel member, the lower member of each panel having a foot at its lower end comprising a sheet metal member having a length less than the distance between the flanges of the lower member and greater than the distance between said lips, the foot being secured in the lower panel member at its lower end with the ends of the foot spaced from the side flanges of the lower panel member, and a sealing member pocketed in said head and extending up out of the upper end of said upper member for engagement with said roof, the spacing of the ends of the head from the side flanges of the upper panel member and the spacing of the ends of the foot from the side flanges of the lower panel member permitting the flanges to move toward one another with accompanying bowing of the webs of the panel members to preserve the integrity of the stopping on relative lateral movement of the ribs of the passageway toward one another with resultant compression of the stopping from the sides thereof, said method comprising engaging the base of a jack with the foot of a lower panel member and the end of an extensible member of the jack with the head of the respective upper panel member, and extending the extensible member of the jack to force the lower panel member down and the upper panel member up for compressing the sealing member pocketed in the head against the roof of the passageway for sealing engagement of said sealing member with the roof.

15. The method of claim 14 wherein the base is engaged with the top and outside of said foot between the flanges of the lower panel member and the upper end of the extensible member of the jack is engaged with the bottom and outside of the head between the flanges of the upper panel member.

16. The method of installing in a mine a plurality of elongate extensible panels adapted to extend vertically in side-by-side relation from the floor to the roof of a passageway in a mine, each panel comprising a first elongate member constituting a lower member of the panel adapted for engagement of its lower end with the floor of the passageway, and a second elongate member constituting an upper member of the panel adapted for engagement of its upper end with the roof of the passageway, each of said panel members being a sheet metal member of channel shape in cross section having a web and flanges at opposite sides of the web, each flange having an inturned portion at its outer edge extending generally parallel to the [web and a lip at the inner edge of the inturned portion extending inwardly toward the ] web, one of said members having a telescoping sliding fit in the other with the webs of the members in engagement, the one member constituting the inner member and the other constituting the outer member of the panel, a plurality of the panels being adapted to be installed in a passageway with the side flanges of the outer members generally in engagement, the upper member of each panel having a head at its upper end, the lower member of each panel having a foot at its lower end, said method comprising:

engaging the base of a jack with the foot of a lower panel member and the end of an extensible member of the jack with the head of the respective upper panel member, and extending the extensible member of the jack to force the lower panel member down and the upper panel member up for sealing engagement of said upper panel member at its upper end with the roof.

17. The method of claim 16 wherein the base is engaged with the top and outside of said foot between the flanges of the lower panel member and the upper end of the extensible member of the jack is engaged with the bottom and outside of the head between the flanges of the upper panel member.

18. A jack for installing a mine stopping comprising a plurality of elongate extensible panels adapted to extend vertically in side-by-side relation from the floor to the roof of a passageway in a mine, each panel comprising a first elongate member constituting a lower member of the panel adapted for engagement of its lower end with the floor of the passageway, and a second elongate member constituting an upper member of the panel adapted for engagement of its upper end with the roof of the passageway, each of said panel members being a sheet metal member of channel shape in cross section having a web and flanges at opposite sides of the web, each flange having an inturned portion at its outer edge extending generally parallel to the web and a lip at the inner edge of the inturned portion extending inwardly toward the web, one of said members having a telescoping sliding fit in the other with the webs of the members in engagement, the one member constituting the inner member and the other constituting the outer member of the panel, a plurality of the panels being adapted to be installed in a passageway with the side flanges of the outer members generally in engagement, the lips of the upper member of each panel terminating short of the upper end of the upper member and thereby providing a notch at the upper end of each lip, the upper member of each panel having a head at its upper end comprising a sheet metal member having a length less than the distance between the flanges of the upper member and greater than the distance between said lips, the head being generally of channel shape in transverse cross section having a web of a width slightly less than the distance between the web of the upper panel member and the edges of the lips fitting between the web of the upper member and the edges of the lips, a first flange extending up from the edge of the web of the head at the inside face of the web of the upper panel member, a second flange extending up from the other edge of the web having a first portion extending up on the inside edges of the lips, a second portion extending out from the upper edge of the first portion over the upper edges of the lips, and a third portion extending up from the outer edge of the second portion on the inside of said inturned portions, the head being secured in the upper panel member at its upper end with the ends of the head spaced from the side flanges of the upper panel member, the lower member of each panel having a foot at its lower end comprising a sheet metal member having a length less than the distance between the flanges of the lower member and greater than the distance between said lips, the foot being secured in the lower panel member at its lower end with the ends of the foot spaced from the side flanges of the lower panel member, and a sealing member pocketed in said head and extending up out of the upper end of said upper member for engagement with said roof, the spacing of the ends of the head from the side flanges of the upper panel member and the spacing of the ends of the foot from the side flanges of the lower panel member permitting the flanges to move toward one another with accompanying bowing of the webs of the panel members to preserve the integrity of the stopping on relative lateral movement of the ribs of the passageway toward one another with resultant compression of the stopping from the sides thereof, said jack having a base adapted to fit between the flanges of a lower panel member and engage the respective foot and an extensible member having a head at its upper end adapted to fit between the flanges of an upper panel member and engage the head of said upper panel member, said jack acting on extension of said extensible member to force the lower panel member down and the upper panel member up, the base having a part engaging the top and a part engaging the outside of said foot and the head on the extensible member has a part engaging the bottom and a part engaging the outside of the head of the upper panel member.

19. A jack for installing in a mine a plurality of elongate extensible panels adapted to extend vertical in side-by-side relation from the floor to the roof of a passageway in a mine, each panel comprising a first elongate member constituting a lower member of the panel adapted for engagement of its lower end with the floor of the passageway, and a second elongate member constituting an upper member of the panel adapted for engagement of its upper end with the roof of the passageway, each of said panel members being a sheet metal member of channel shape in cross section having a web and flanges at opposite sides of the web, each flange having an inturned portion at its outer edge extending generally parallel to the [web and a lip at the inter edge of the inturned portion extending inwardly toward the ] web, one of said members having a telescoping sliding fit in the other with the webs of the members in engagement, the one member constituting the inner member and the other constituting the outer member of the panel, a plurality of the panels being adapted to be installed in a passageway with the side flanges of the outer members generally in engagement, the upper member of each panel having a head at its upper end, the lower member of each panel having a foot at its lower end, said jack comprising:

a base adapted to fit between the flanges of a lower panel member and engage the respective foot and an extensible member having a head at its upper end adapted to fit between the flanges of an upper panel member and engage the head of said upper panel member, said jack acting on extension of said extensible member to force the lower panel member down and the upper panel member up, the base having a part engaging the top and a part engaging the outside of said foot and the head on the extensible member having a part engaging the bottom and a part engaging the outside of the head of the upper panel member.

*20. The method of installing in a mine a plurality of elongate extensible panels adapted to extend vertically in side-by-side relation from the floor to the roof of a passageway in a mine, each panel comprising a first elongate member constituting a lower member of the panel adapted for engagement of its lower end with the floor of the passageway, and a second elongate member constituting an upper member of the panel adapted for engagement of its upper end with the roof of the passageway, each of said panel members being a sheet metal member of channel shape in cross section having a web and flanges at opposite sides of the web, each flange having an inturned portion at its outer edge extending generally parallel to the web, one of said members having a telescoping sliding fit in the other with the webs of the members in engagement, the one member constituting the inner member and the other constituting the outer member of the panel, a plurality of the panels being adapted to be installed in a passageway with the side flanges of the outer members generally in engagement, the upper member of each panel having a head at its upper end, said method comprising:*

*engaging the end of an extensible member of a jack with the head of a respective upper panel member;*

*extending the extensible member of the jack to effect relative telescopic extension of the upper and lower panel members thereby to force the upper end of the upper panel member into pressure engagement with the roof; and*

*disengaging the jack from the head of the upper panel member leaving the upper and lower panel members in pressure engagement at their upper and lower ends with the roof and floor of the passageway.*

* * * * *